UNITED STATES PATENT OFFICE.

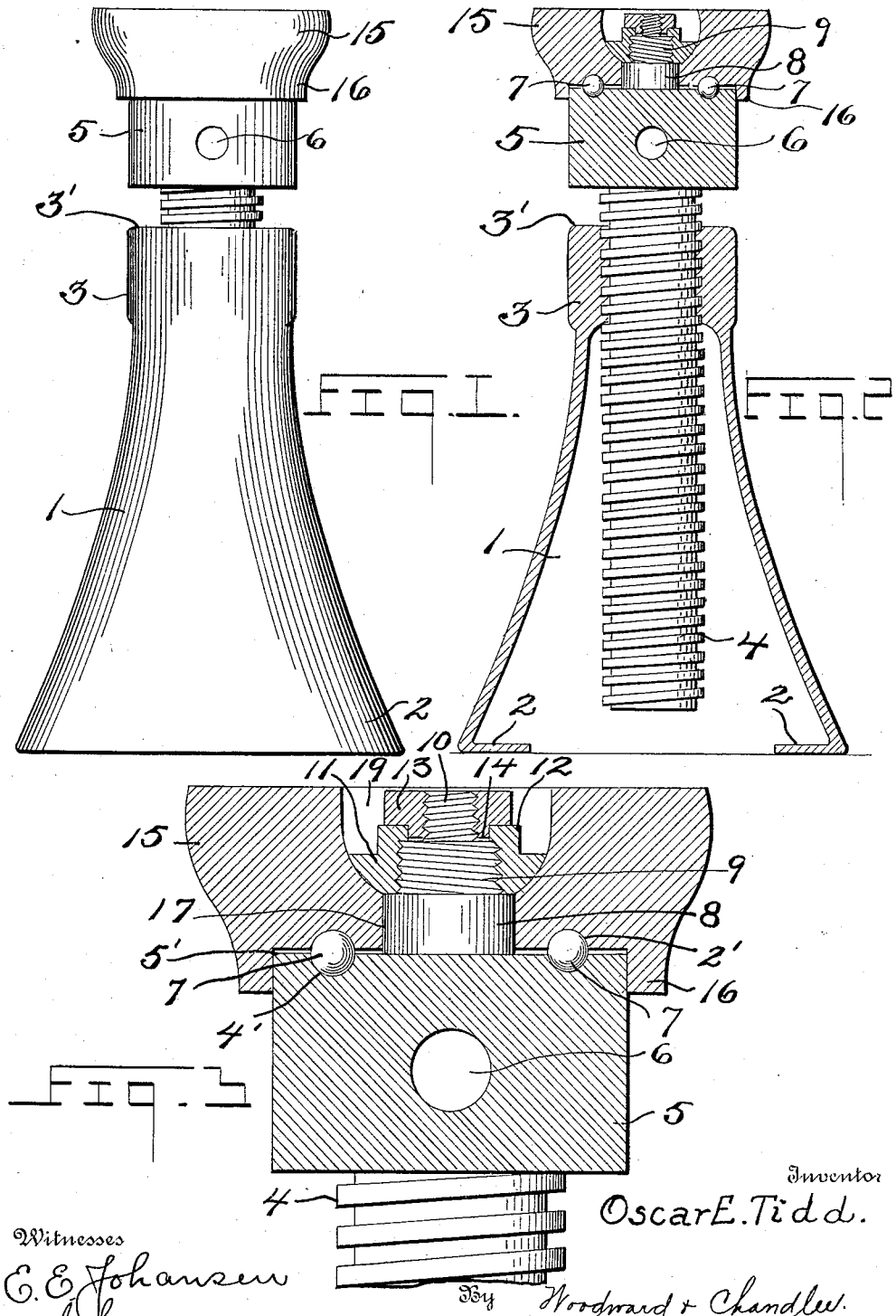

OSCAR E. TIDD, OF GEORGETOWN, MASSACHUSETTS.

BALL-BEARING JACK-SCREW.

964,824.  Specification of Letters Patent.  Patented July 19, 1910.

Application filed July 28, 1909.  Serial No. 510,007.

*To all whom it may concern:*

Be it known that I, OSCAR E. TIDD, a citizen of the United States, residing at Georgetown, in the county of Essex and State of Massachusetts, have invented certain new and useful Improvements in Ball-Bearing Jack-Screws, of which the following is a specification.

This invention has relation to certain new and useful improvements in jack screws.

The primary object of my invention is to provide a ball-bearing jack screw, so constructed that the ball races as well as the anti-friction balls can be kept in a lubricated condition.

A further object is to provide the jam cap of a jack screw, with an oil cup forming socket in communication with the ball races carrying the balls supporting the head.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a portion of this specification, and in which like numerals of reference indicate similar parts in the severals views, Figure 1 shows an elevation of a jack screw embodying my invention. Fig. 2 is a central sectional view thereof. Fig. 3 shows an enlarged detached detail of the head and jam cap as employed in my invention.

My invention has for its object to improve the construction and operation of that class of jack screws, in which a screw head is provided with a jam cap carried by means of a ball-bearing. In jack screws of this class, as heretofore constructed, no provision is made, for properly lubricating the bearing, or for removing the grit and dust that collects within the lower ball race.

In the accompanying drawings the numeral 1 designates a bell shaped hollow standard, the flaring lower edge of which is provided with an inwardly directed base flange 2, while at the upper end this standard is provided with the screw collar 3, this collar ending in the flat upper bearing surface 3'. Revolubly held within this collar 3, is the jack screw 4, having the head 5 provided with the transversely positioned capstan openings 6 arranged to receive a capstan pin or lever employed in raising or lowering the screw. The flat upper face 5' of this head is provided with the peripheral ball race 4' within which the anti-friction balls 7 freely rotate. Centrally held to this head 5, is the upstanding stud 8 forming an integral portion of this head 5 and extending from this stud 8 is the reduced screw stem 9 of a diameter less than that of the stud as is clearly disclosed in Fig. 3. Centrally extending from this screw 9 is the redued bolt 10, this bolt stem being of a diameter less than the screw 9 and being threaded in a direction opposite to the screw stem 9.

Revolubly held upon the collar 8 and carried by the anti-friction balls 4' is the jam cap 15 provided centrally with the collar aperture 17, from which extends the oil cup forming socket 19, while the lower edge of this jam cap is skirted by the peripheral guard flange 16 arranged to rotate about the head 5 in the manner disclosed.

Threaded upon the screw stem 9, is the conical nut 11, the under face of which is arranged to contact with the socket surface, this nut being provided with a reduced collar 12 extending a short distance beyond the screw stem 9 as disclosed in Fig. 3. Threading upon the bolt 10, is the lock nut 13, provided with the projecting collar 14 arranged to be held within the upper end of the collar 12. As shown, the bolt 10 ends at a point below the upper face of the jam cap 15. As disclosed, the collar 14 does not contact with the upper surface of the screw stem 9, the lock nut being arranged to find a seat upon the upper edge of the collar 12. An incident of convenience to this arrangement of jam nuts, is that as the oil feeds into the lower ball race through the cup forming socket 19, it expels the grit and dust within the lower race, the superfluous oil escaping between the guard flange 16 and the head 5. The jack screw is simple and inexpensive in construction and both durable and efficient in operation.

The jam nut upon its under face is provided with a ball race 2' arranged for coaction with the ball race 4' within the head 5.

Having thus described my said invention, what I claim as new and desire to secure by United States Letters Patent is:

A screw for a jack screw having an enlarged head provided with transversely positioned openings and above with a ball race, a stud centrally extending from said head and continued in a reduced screw stem from which extends a reduced bolt end threaded in a direction opposite to said screw stem, balls within said race, a jam cap having a central circular opening to receive said stud from which extends a conical socket, said jam cap having a ball race upon its under surface for co-action with said first mentioned ball race, a conical nut upon said stem and working within said socket, and a lock nut upon said bolt, all arranged as and in the manner disclosed.

In testimony whereof I affix my signature, in presence of two witnesses.

OSCAR E. TIDD.

Witnesses:
EDWARD S. FICKETT,
FANNIE M. FICKETT.